US010616396B2

(12) United States Patent
Gersten

(10) Patent No.: US 10,616,396 B2
(45) Date of Patent: *Apr. 7, 2020

(54) DANGER DETECTION SYSTEM

(71) Applicant: Adam Gersten, Mesa, AZ (US)

(72) Inventor: Adam Gersten, Mesa, AZ (US)

(*) Notice: Subject to any disclaimer, the term of this patent is extended or adjusted under 35 U.S.C. 154(b) by 0 days.

This patent is subject to a terminal disclaimer.

(21) Appl. No.: 15/635,034

(22) Filed: Jun. 27, 2017

(65) Prior Publication Data
US 2017/0374192 A1 Dec. 28, 2017

Related U.S. Application Data

(60) Provisional application No. 62/355,768, filed on Jun. 28, 2016.

(51) Int. Cl.
H04M 1/725 (2006.01)
G08B 21/02 (2006.01)
G08B 25/10 (2006.01)
H04W 4/02 (2018.01)
H04N 7/14 (2006.01)
H04N 5/77 (2006.01)
H04N 7/18 (2006.01)
H04N 9/82 (2006.01)
G08B 13/16 (2006.01)

(52) U.S. Cl.
CPC .... H04M 1/72538 (2013.01); G08B 13/1672 (2013.01); G08B 21/02 (2013.01); G08B 21/0222 (2013.01); G08B 21/0297 (2013.01); G08B 25/10 (2013.01); H04N 5/772 (2013.01); H04N 7/147 (2013.01); H04N 7/185 (2013.01); H04N 7/188 (2013.01); H04N 9/8205 (2013.01); H04W 4/023 (2013.01); H04M 1/72572 (2013.01)

(58) Field of Classification Search
CPC .......... H04M 1/72538; H04M 1/72572; H04N 7/188; H04N 7/185; H04N 5/772; H04N 7/147; H04W 4/023; G08B 25/10; G08B 21/02; G06F 9/4446
See application file for complete search history.

(56) References Cited

U.S. PATENT DOCUMENTS

| 8,665,089 | B2* | 3/2014 | Saigh | H04M 1/7253 340/539.1 |
|---|---|---|---|---|
| 9,390,607 | B2* | 7/2016 | Bell | G08B 21/02 |
| 2009/0273682 | A1* | 11/2009 | Shekarri | G01P 1/127 348/207.1 |
| 2011/0136463 | A1* | 6/2011 | Ebdon | G01C 21/20 455/404.1 |
| 2012/0063270 | A1* | 3/2012 | Angell | G01S 5/0027 367/127 |

(Continued)

Primary Examiner — Stella L. Woo
(74) Attorney, Agent, or Firm — Christopher Mayle; John Houvener; Bold IP PLLC

(57) ABSTRACT

A danger detection system is provided. The system includes a user computing device programmed to receive from a microphone of the computing device a signal indicating a gunshot-like sound and automatically determine if the gunshot-like sound is a gunshot. The user computing device is also programmed to automatically determine a location of the gunshot; and to automatically generate and send to a display of the user computing device a safety notification in response to determining if the gunshot is within a predetermined distance.

11 Claims, 17 Drawing Sheets

(56) References Cited

U.S. PATENT DOCUMENTS

| | | | |
|---|---|---|---|
| 2012/0229275 A1* | 9/2012 | Mattern | G01S 5/18 340/540 |
| 2012/0295579 A1* | 11/2012 | Miyano | H04L 12/6418 455/404.2 |
| 2014/0173960 A1* | 6/2014 | Kountotsis | F41A 17/063 42/1.02 |
| 2015/0002293 A1* | 1/2015 | Nepo | G08B 15/004 340/539.13 |
| 2015/0111524 A1* | 4/2015 | South | H04W 4/22 455/404.2 |
| 2015/0116501 A1* | 4/2015 | McCoy | H04N 5/23206 348/169 |
| 2015/0177363 A1* | 6/2015 | Hermann | G01S 5/22 367/118 |
| 2015/0269835 A1* | 9/2015 | Benoit | G08B 25/016 340/539.13 |
| 2017/0032402 A1* | 2/2017 | Patsiokas | G06Q 30/0266 |
| 2017/0237950 A1* | 8/2017 | Araya | H04N 7/188 386/223 |

* cited by examiner

DANGER DETECTION SYSTEM

CROSS REFERENCE TO RELATED APPLICATION[S]

This application claims priority to U.S. Provisional patent application entitled "GUNSHOT DETECTION SYSTEM," Ser. No. 62/355,768, filed Jun. 28, 2016, the disclosure of which is hereby incorporated entirely herein by reference.

BACKGROUND OF THE INVENTION

Technical Field

This invention relates generally to a danger detection system and more particularly to a system including a mobile application operable on a mobile computing device for detecting a gunshot.

State of the Art

There are various types of dangerous situations and events that occur where a gun is utilized. Often times victims and bystanders are unsure as to what is occurring and do not have the needed information to appreciate their proximity to a dangerous situation or how they might reach a safe place. Systems have been created to attempt to solve this problem, but they are lacking in the ability to utilize easily by the general public on a computing device that is mobile while still tying in the information to law enforcement and the like, or to notify other nearby users of the system.

Accordingly, there is a need for an improved danger detection system.

DISCLOSURE OF THE INVENTION

The present invention relates to a danger detection system that detects and identifies a gunshot, determines the approximate location of the gunshot and directs the user towards safe areas away from the danger.

An embodiment includes a danger detection system comprising: a user computing device programmed to: receive from a microphone of the computing device a signal indicating a gunshot-like sound and automatically determine if the gunshot-like sound is a gunshot; automatically determine an approximate location of the gunshot; and automatically generate and send to a display of the user computing device a safety notification in response to determining if the gunshot is within a predetermined distance and possible safe avenues of escape for the user.

Another embodiment includes a danger detection system comprising: a user computing device programmed to: receive from a microphone of the computing device a signal indicating a gunshot-like sound and automatically determine if the gunshot-like sound is a gunshot; automatically determine an approximate location of the gunshot; automatically generate and activate a public safety notification including the approximate location of the gunshot; and automatically generate and send to a display of the user computing device a safety notification in response to determining if the gunshot is within a predetermined distance and possible safe avenues of escape for the user.

Yet another embodiment includes a danger detection system comprising: a camera programmed to: receive from a microphone of the camera a signal indicating a gunshot-like sound and automatically determine if the gunshot-like sound is a gunshot; automatically determine an approximate location of the gunshot; automatically generate and activate a public safety notification including the approximate location of the gunshot; and automatically initiate video and audio recording function of the camera.

The foregoing and other features and advantages of the present invention will be apparent from the following more detailed description of the particular embodiments of the invention, as illustrated in the accompanying drawings.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF EMBODIMENTS OF THE INVENTION

As discussed above, embodiments of the present invention relate to a danger detection system as a system-level mobile OS feature that uses a mobile device's microphones to continually listen for the acoustic fingerprint of a gunshot. Upon detecting a gunshot the mobile device operates a mobile application providing instruction to use its microphones and process the information received from the microphones to determine the approximate distance of the gunshot from the device, and the direction of the gunshot in relation to the device. If the distance is determined to be within an preset distance, such as, but not limited to approximately 200 m, and the gunshot did not appear to originate from the vicinity of an authorized shooting facility, the device will incessantly attract the user's attention (e.g., vibrating, flashing screen, alarm tone, etc.), and use geolocation information along with mapping data to determine and display an approximate location of the gunshot relative to the user and provide graphical direction to the user of possible safe locations to escape to from the gunfire. Additionally, a plurality of danger detection system enabled mobile devices will anonymously work in concert to help create real-time databases of "danger spots" to more accurately determine the location of gunshots and help other nearby mobile devices better protect and warn users.

Figure 1:
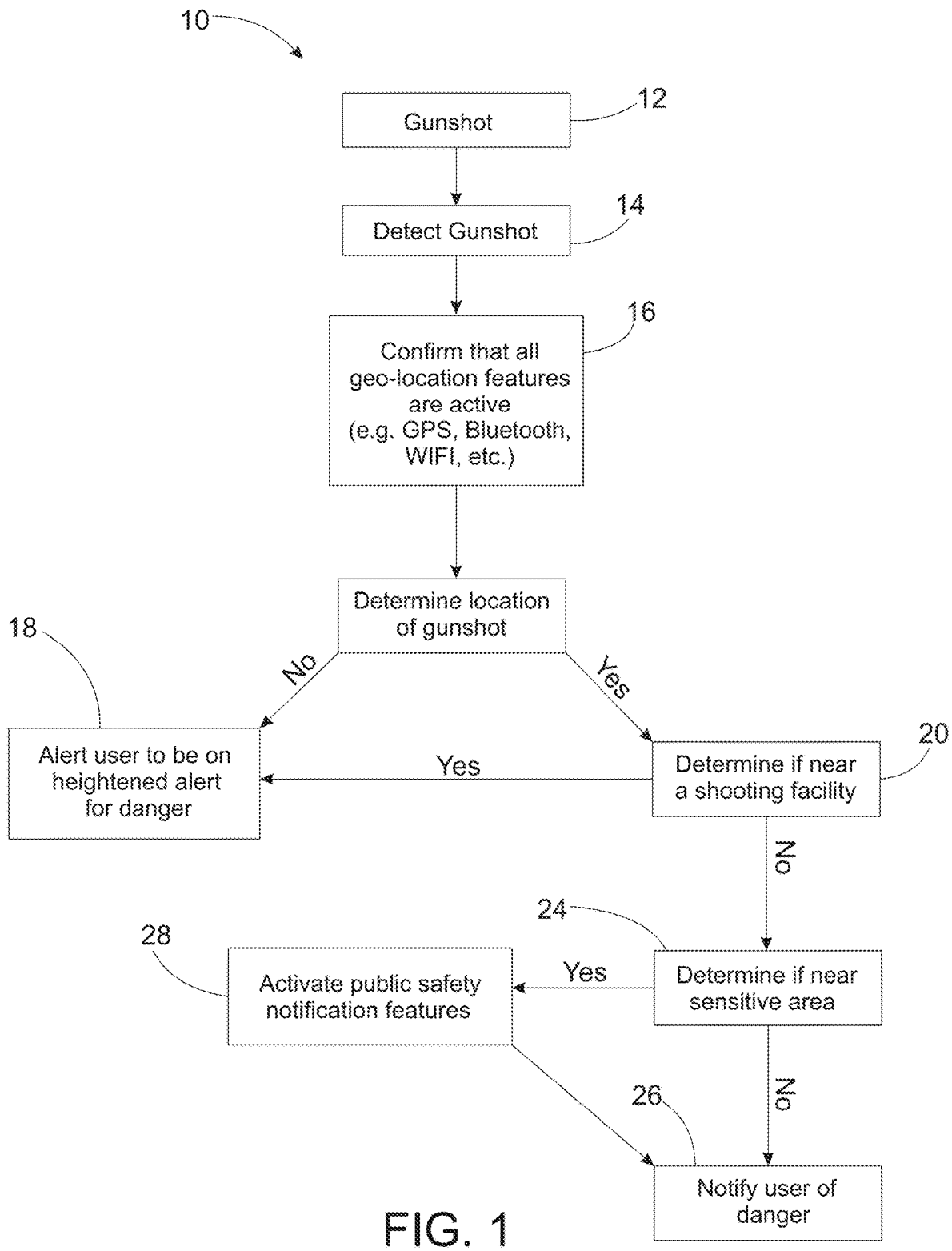
FIG. 1 is a flow chart of a method of using a danger detection system on a mobile device, in accordance with embodiments.

Referring to the drawings, FIG. 1 depicts a flow chart of a method 10 of using a danger detection system, in accordance with embodiments. The method 10 begins with a gunshot (Step 12). The method 10 includes the system automatically detecting a gunshot (Step 14); and automatically determining a location of the gunshot (Step 16). Step 16 of determining a location of the gunshot may further include automatically calculating a distance between the location of the gunshot and a mobile device operating the danger detection system. The method 10 may then include automatically determining if the gunshot location is within a predetermined distance of the mobile device, such as, but not limited to 200 m.

If the gunshot is not within the preset distance, the method 10 includes the system alerting the user to be on heightened alert for danger (Step 18). If the gunshot is within the preset distance, the method 10 includes determining if the mobile device is near an authorized shooting facility (Step 20).

If the mobile device is near a shooting facility, then the system alerts the user to be on heightened alert for danger (Step 18). If the gunshot is not near a shooting facility, the method 10 includes determining whether all geolocation features of the mobile device are activated (Step 22). The method 10 then includes determining whether the mobile device is near a sensitive area (Step 24). If the mobile device is near a sensitive area, the method 10 includes activating public safety notification features (Step 28). If the mobile device is not near a "sensitive area," the method 10 includes notifying the user of danger (Step 26).

Embodiments of the danger detection system may also be used to aid law enforcement in detecting and responding appropriately to active shooter scenarios, by locating bystanders/potential victims in relation to gunshots. This allows 911 operators to more intelligently advise bystanders about where they might safely "shelter in place." Meanwhile, police and dispatchers can respond more intelligently to an active shooter scenario by leveraging the sound data collection capabilities of nearby smartphones and other devices running an OS that features the danger detection system.

The danger detection system may include a mapping function that may be integrated with various indoor mapping technologies, to help people in potential hostage situations to find safe or safer escape routes for bystanders and potential victims inside of buildings themselves. These "safe or safer escape routes" may include routes to buildings, facilities and/or locations that have security, including police stations, fire stations, hospitals, and government buildings. Embodiments of the present invention may include information stored in order to provide prioritized "safe" places for a user to seek security in. These "safe" places may include listings of places, locations, buildings, and/or facilities with a continual or regular security presence. Further, if the danger detection system is programmed to be able to differentiate the sounds of different gunshots, this information can be conveyed to law enforcement to better identify and more quickly resolve active shooter situations (e.g., if the gunshot came from a cartridge that has typically been used in hunting rifles, then law enforcement has information to better estimate how many shots a suspect could fire in a set amount of time and how often the shooter would need to reload, whereas, if the gunshot was from a 7.62×39, it most likely was fired from an AK-47 or SKS type rifle, meaning both larger capacity and a greater rate of fire).

Figure 2:
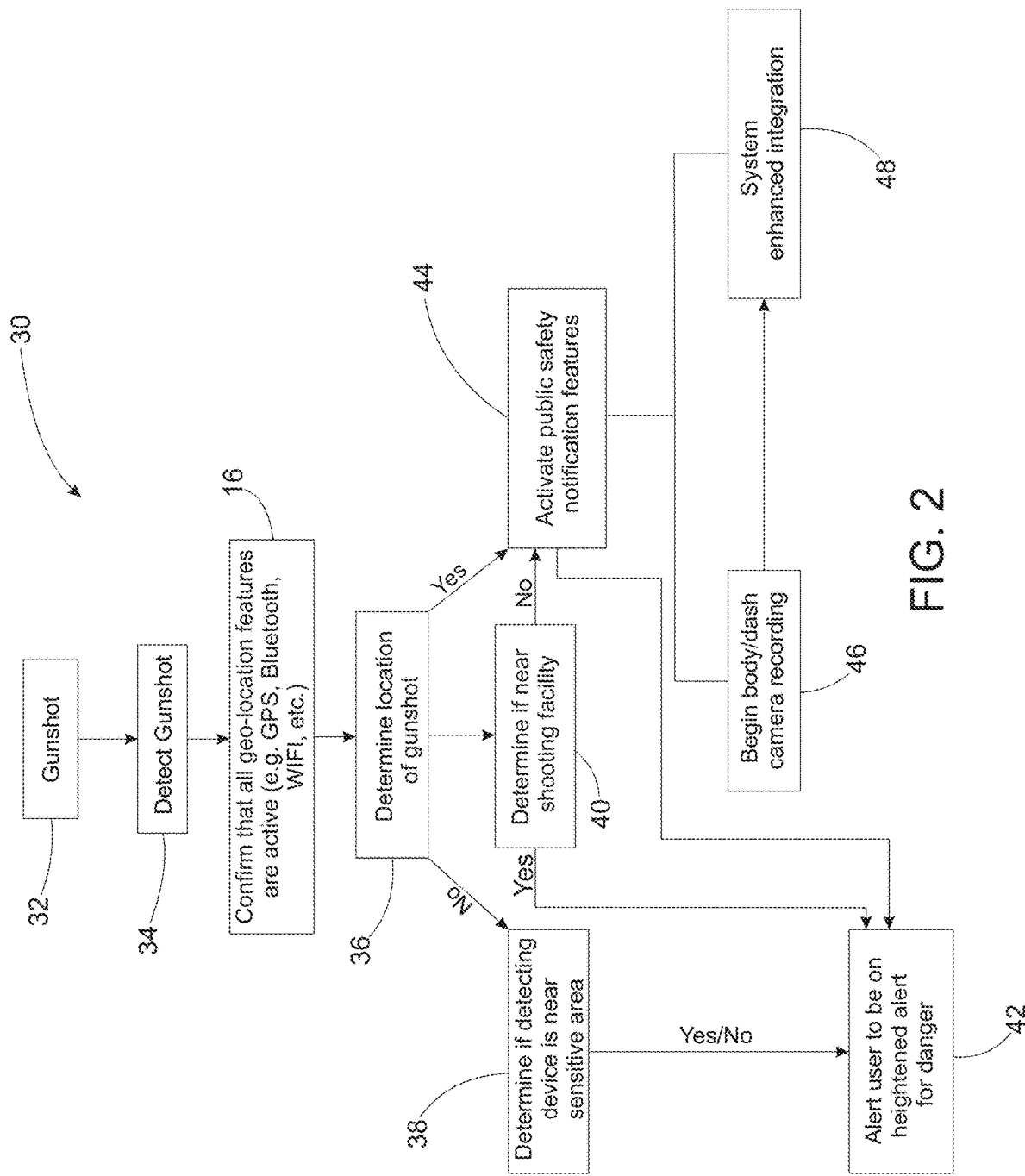
FIG. 2 is a flow chart of a method of using a danger detection system equipped law enforcement body or dashboard camera, in accordance with embodiments.

Referring further to the drawings, FIG. 2 depicts a particular embodiment of the present invention that may be utilized by law enforcement and the like, wherein the users have a mobile device, such as, but not limited to a body camera. In these embodiments, the police body cameras may be equipped with a danger detection system. FIG. 2 depicts a flow chart of a method 30 of using a body camera equipped with a danger detection system, in accordance with embodiments. The method 30 begins with a gunshot (Step 32). The method 30 includes the system automatically detecting a gunshot (Step 34); and automatically determining a location of the gunshot (Step 36). Step 36 of determining a location of the gunshot may further include automatically calculating a distance between the location of the gunshot and a body camera operating the danger detection system. The method 30 may then include automatically determining if the gunshot location is within a preset distance of the body camera, such as, but not limited to 200 m.

If the gunshot is not within the predetermined distance, the method 30 includes the system alerting the user to be on heightened alert for danger (Step 38). If the gunshot is within the predetermined distance, the method 30 includes determining if the body camera is near an authorized shooting facility (Step 40) and activates public safety notification features (Step 44). If the body camera is near a shooting facility, then the system alerts the user to be on heightened alert for possible danger (Step 42). If the gunshot is not near a shooting facility, the method 30 continues with Step 44 of activating public safety notification features. Step 44 of activating public safety notification features includes beginning body/dash camera recording (Step 46) and activating system enhanced integration (Step 48). Step 48 of activating enhanced integration may include localized area illumination, localized surveillance optimization, traffic signal override and the like.

In the embodiment depicted in FIG. 2, the system may include additional functionality, such as but not limited to creation of metadata tags pinpointing the distance and direction of the gunshot with respect to the officer's body camera, and with the integration of gyroscopic sensors and accelerometers in the body camera, the orientation of the officer with respect to the gunshot, which way the officer was facing, as well as how they moved in response to the detected gunshot, all of which may be recorded by the body camera of the system.

In some embodiments of a body camera equipped with the danger detection system, certain tonal changes that occur when voices are raised, may be identified by the danger detection system and the system may activate the body camera to start recording. When the system detects changes in speech indicative of raised voices, the camera will be more likely to record the sort of police-public encounters that often result in the use of force. This information and video recording may be a valuable piece of evidence to determine how such encounters take place, and whether the appropriate amount of force was utilized by the officer in this situation, and further to serve as evidence as to the behavior of the other person(s) involved in the encounter. It will be understood that the function of the body camera of recording and storing the video operates in a manner of conventional body cameras.

Referring back to FIG. 2 and Step 48 of activating enhanced integration, one aspect is optimizing localized surveillance. For example, and without limitation, red light cameras and other municipal surveillance cameras, equipped with microphones and running the danger detection system may, upon detection of a gunshot, immediately throw a "spotlight" on the area where the shot originated by increasing localized streetlight brightness or the like. Additionally, municipal cameras in the immediate area (surveillance cameras, red-light cameras, photo radar cameras, etc.) may automatically adjust their settings to optimize clear recordings of the area surrounding where the shot originated (e.g., pan-tilt-zoom, focus, infrared-mode, and increasing framerate in variable frame rate cameras).

Additionally, danger detection system equipped body cameras and dashboard cameras, possessing mobile communications capabilities, can similarly activate this protocol for increased illumination when a dashboard camera or an officer's body camera activates to the sound of a gunshot. In law enforcement deadly-force encounters occurring at night, law enforcement would be aided by more light, not less. With a greater amount of light shining upon both the police and the suspect, there would be less chance for confusion and ambiguity about what really happened in these encounters.

When law enforcement respond to a violent crime (home invasion, sexual assault, homicide, abduction, etc.) and the suspect or victim is not clearly in sight, extra lighting in the area of a police search would aid to speed the search along (similarly, when the police search for a missing child, more light would increase their chances of quickly finding them). Further, in some embodiments, a city or other municipality may manage a high level of integration of systems, and traffic signals could be used to automatically reroute traffic away from areas that have been cordoned off by law enforcement, thereby automatically adjusting traffic signals so police do not need to direct traffic by hand. This would reduce law enforcement roadside injuries and fatalities.

Figure 3:
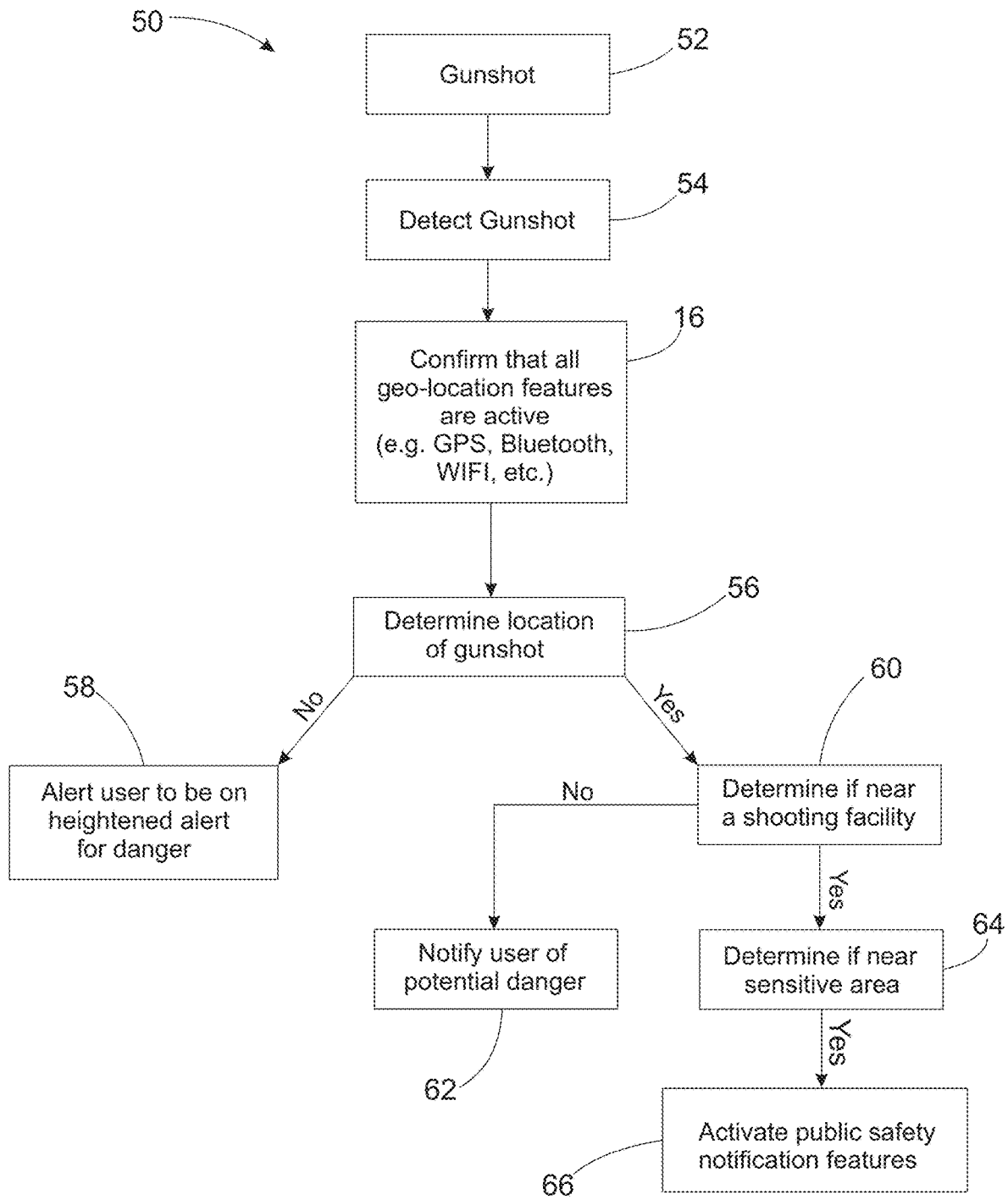
FIG. 3 is a flow chart of a method of using a danger detection system equipped home automation system, in accordance with embodiments.

Referring again to the drawings, FIG. 3 depicts embodiments of the present invention that may be useful in home automation and security products. Motion sensors and cameras in a home may also alert to sounds and can initiate actions, such as, but not limited to turn on lights, text or e-mail a home owner, etc. based upon stored set criteria. The devices and sensors of a home automation system may include a danger detection system to allow these sensors the ability to recognize the sound of a gunshot and take preprogrammed actions unique to that sound (e.g., call 911, send user an emergency text, etc.).

FIG. 3 depicts a flow chart of a method 50 of using a home automation system equipped with a danger detection system, in accordance with embodiments. The method 50 begins with a gunshot (Step 52). The method 50 includes the system automatically detecting a gunshot (Step 54); and automatically determining a location of the gunshot (Step 56). Step 56 of determining a location of the gunshot may further include automatically determining if the gunshot and the danger detection system are within a preset distance of each other.

If the gunshot is not within the predetermined distance, the method 50 includes the system alerting the user to be on heightened alert for possible danger (Step 58). If the gunshot is within the predetermined distance, the method 50 includes determining if the home automation system is near a shooting facility (Step 60). If the danger detection system is not near an authorized shooting facility, the method 60 continues with Step 62 of notifying the user of potential danger. If the home automation system is near a shooting facility, then the method 50 determines if the gunshot location is near a sensitive area (Step 64). If the gunshot location is near a sensitive area, the method 50 includes activating public safety notification features (Step 66), such as, but not limited to call 911, send user an emergency text, and the like.

Many technology companies are expanding into home automation (which now may include home security), and many of these systems have microphones for a number of reasons. These technologies may be used to integrate with a danger detection system according to embodiments of the present invention.

Figure 4:
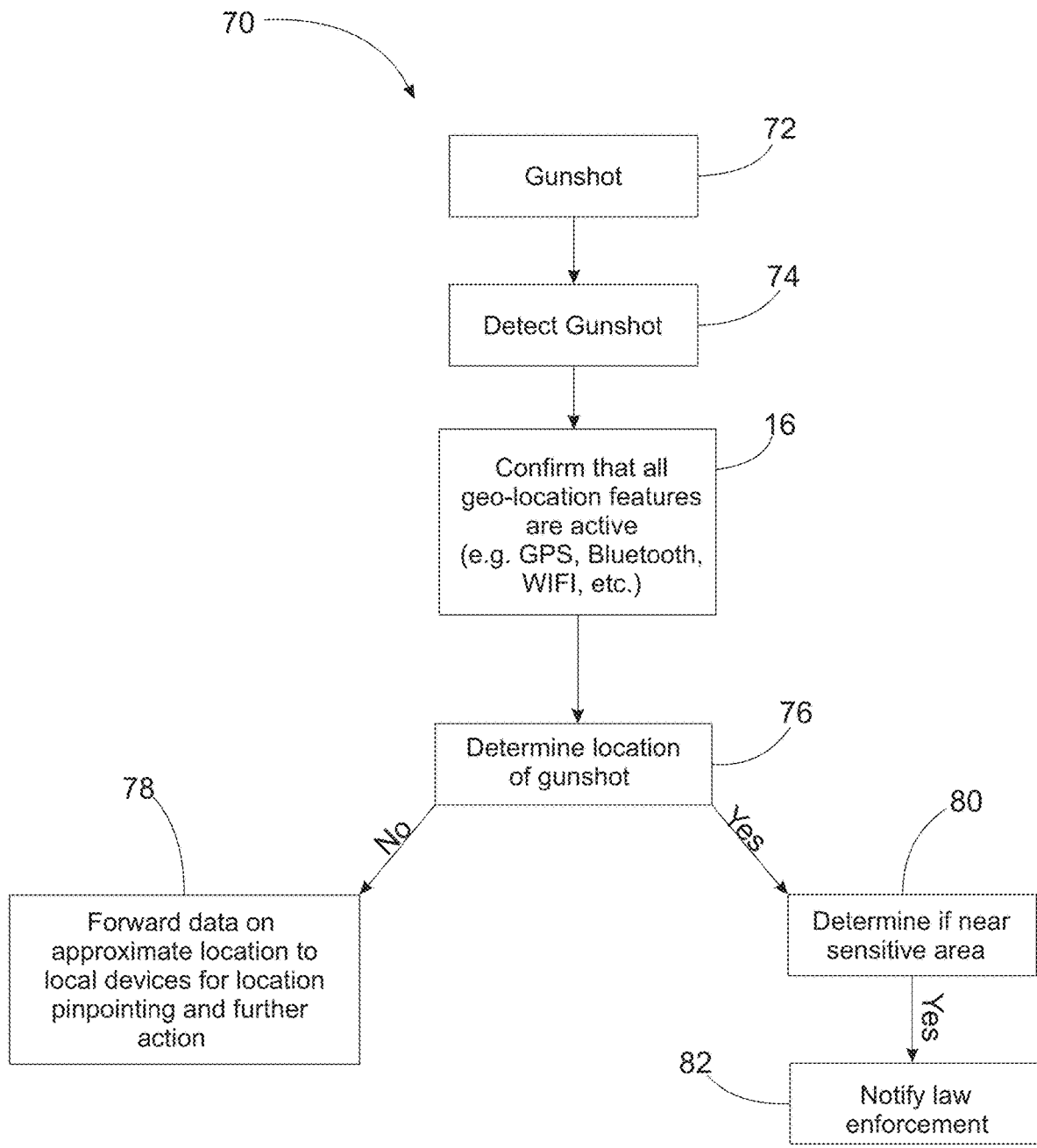
FIG. 4 is a flow chart of a method of using a danger detection system in a government setting, in accordance with embodiments.

FIG. 4 depicts a flow chart of a method 70 of using a danger detection system in a municipal/government implementation, in accordance with embodiments. The method 70 begins with a gunshot (Step 72). The method 70 includes the system automatically detecting a gunshot (Step 74); and automatically determining a location of the gunshot (Step 76). Step 76 of determining a location of the gunshot may further include automatically calculating a distance between the location of the gunshot and mobile devices operating the danger detection system. The method 70 may then include automatically determining if the gunshot location is within a preset distance of the mobile device, such as, but not limited to 200 m.

If the gunshot is not within the predetermined distance, the method 70 includes the system forwarding data on approximate location of the gunshot to local devices for location pinpointing and further action (Step 78). If the gunshot is within the preset distance, the method 70 includes determining if the mobile device is near a sensitive area (Step 80). If the mobile device is near a sensitive area, the method 70 includes notifying law enforcement (Step 82).

Figure 17:
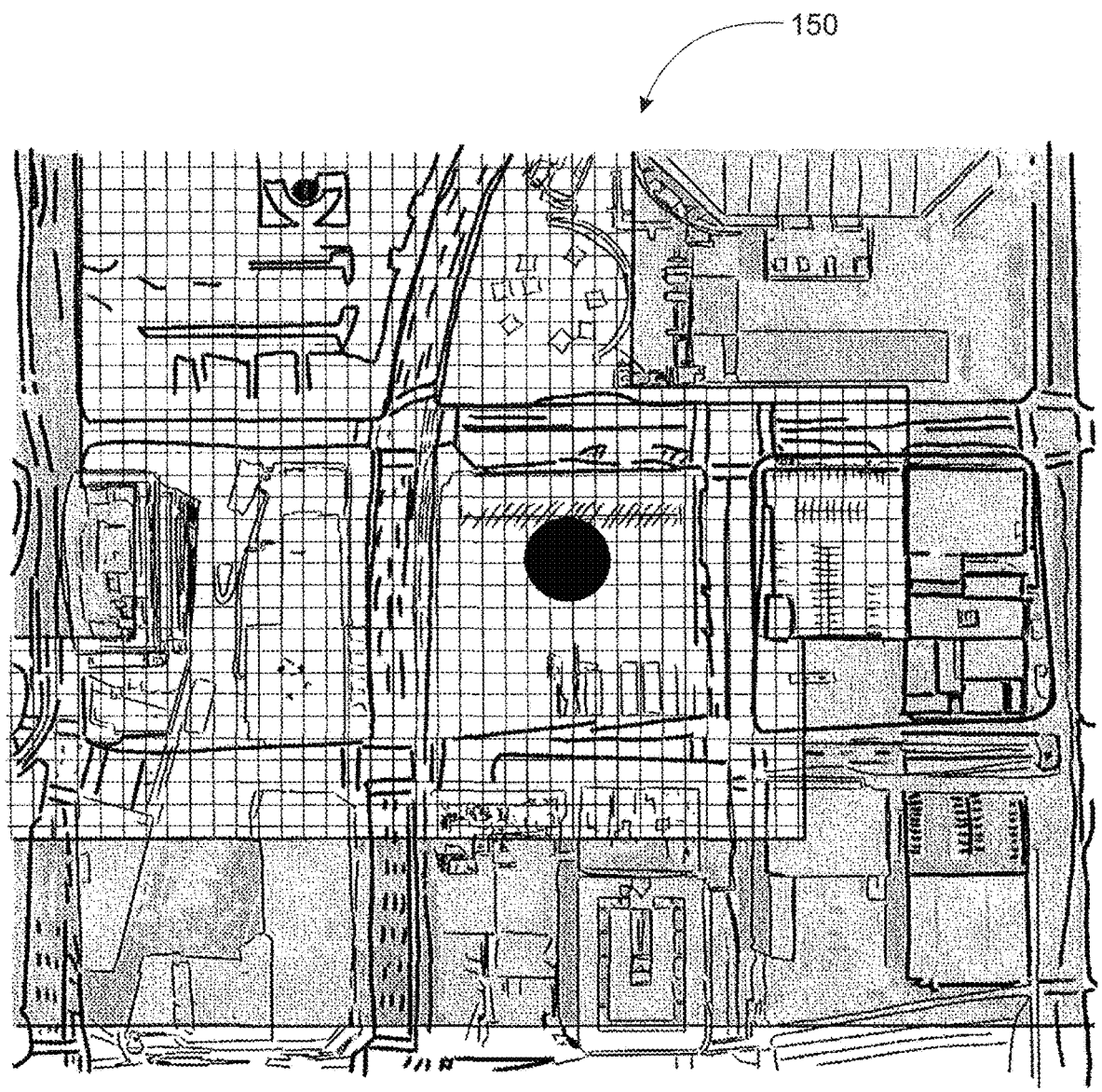
FIG. 17 is a view of a data stored in a danger directoty of a danger detection system on a mobile device, in accordance with embodiments.

According to embodiments of the present invention, the danger detection system may include a geographic "danger directory." The danger directory may be a server-side database of a location(s) of reported gunshots detected by danger detection system equipped devices in an area, along with information gleaned from various other sources (traffic-condition reporting services and apps, law enforcement social media feeds and news releases, media reports, etc.), collated and integrated into a database that danger detection system-enabled mobile devices can utilize in mapping-out and displaying danger spots or areas for the device's user, such as information shown in danger directory data 150 of FIG. 17.

Figure 5:
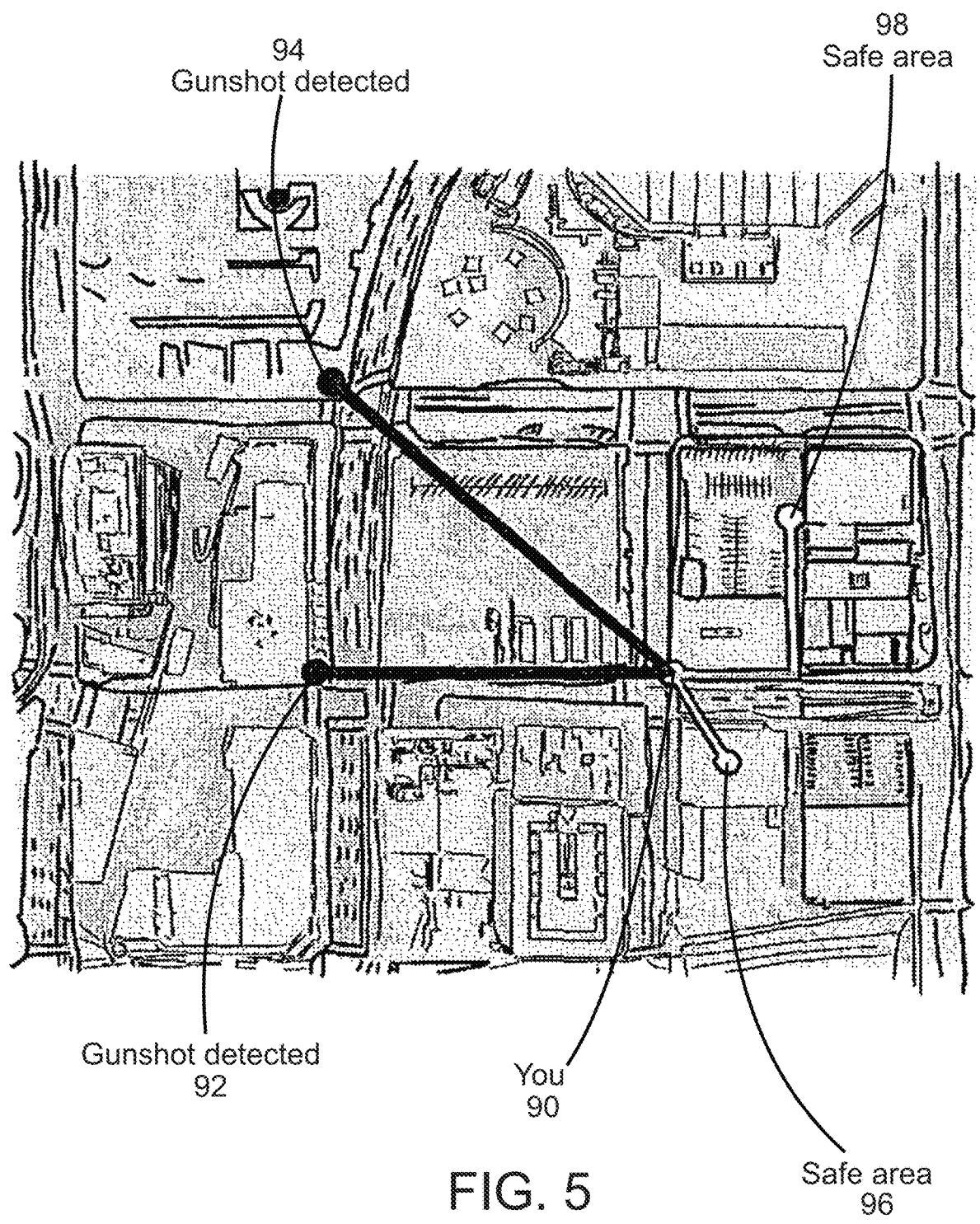
FIG. 5 is a view of a map of a danger detection system on a mobile device, in accordance with embodiments.
Figure 6:
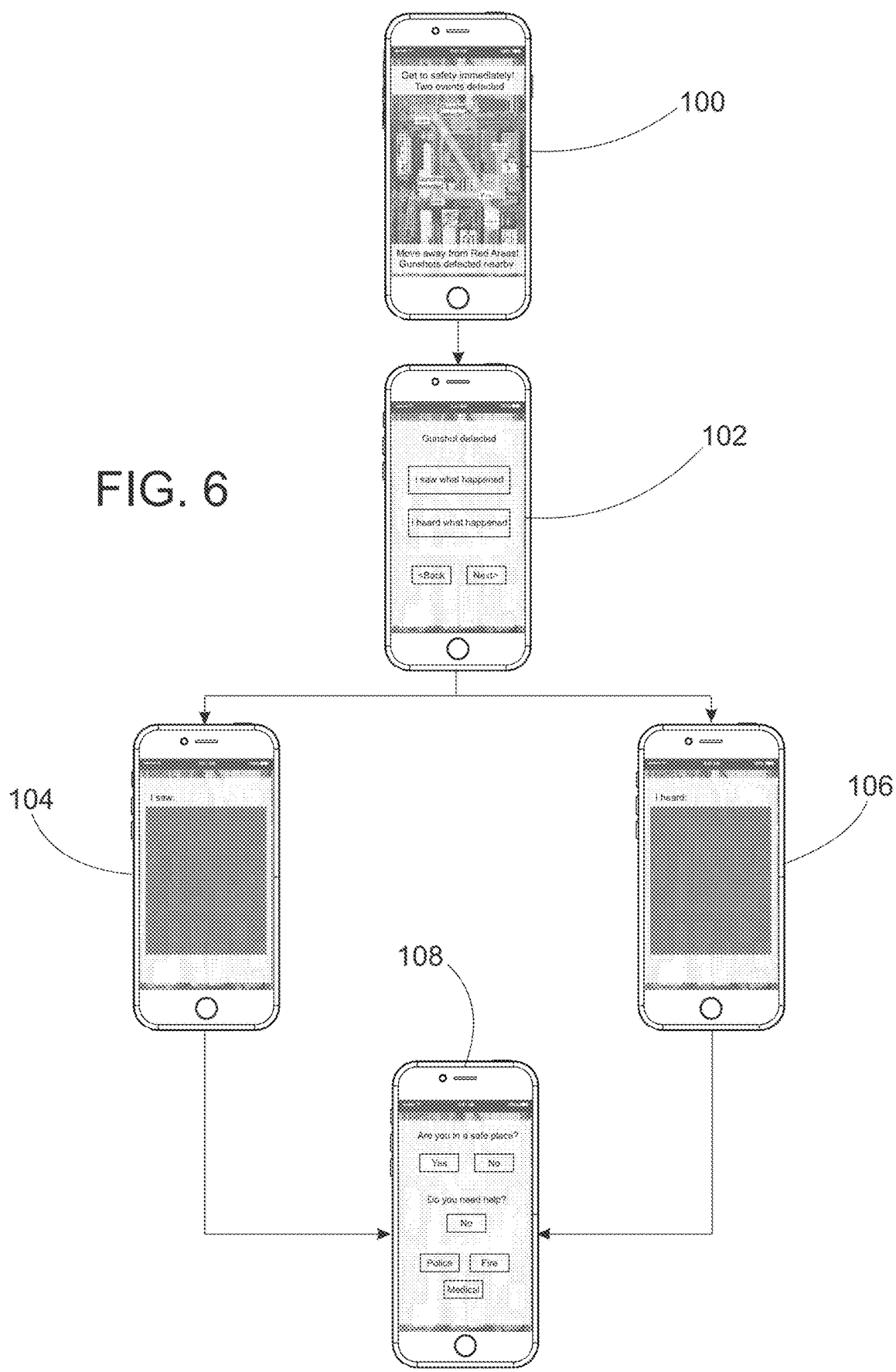
FIG. 6 is a flow chart of user interfaces of a danger detection system on a mobile device, in accordance with embodiments.
Figure 7:
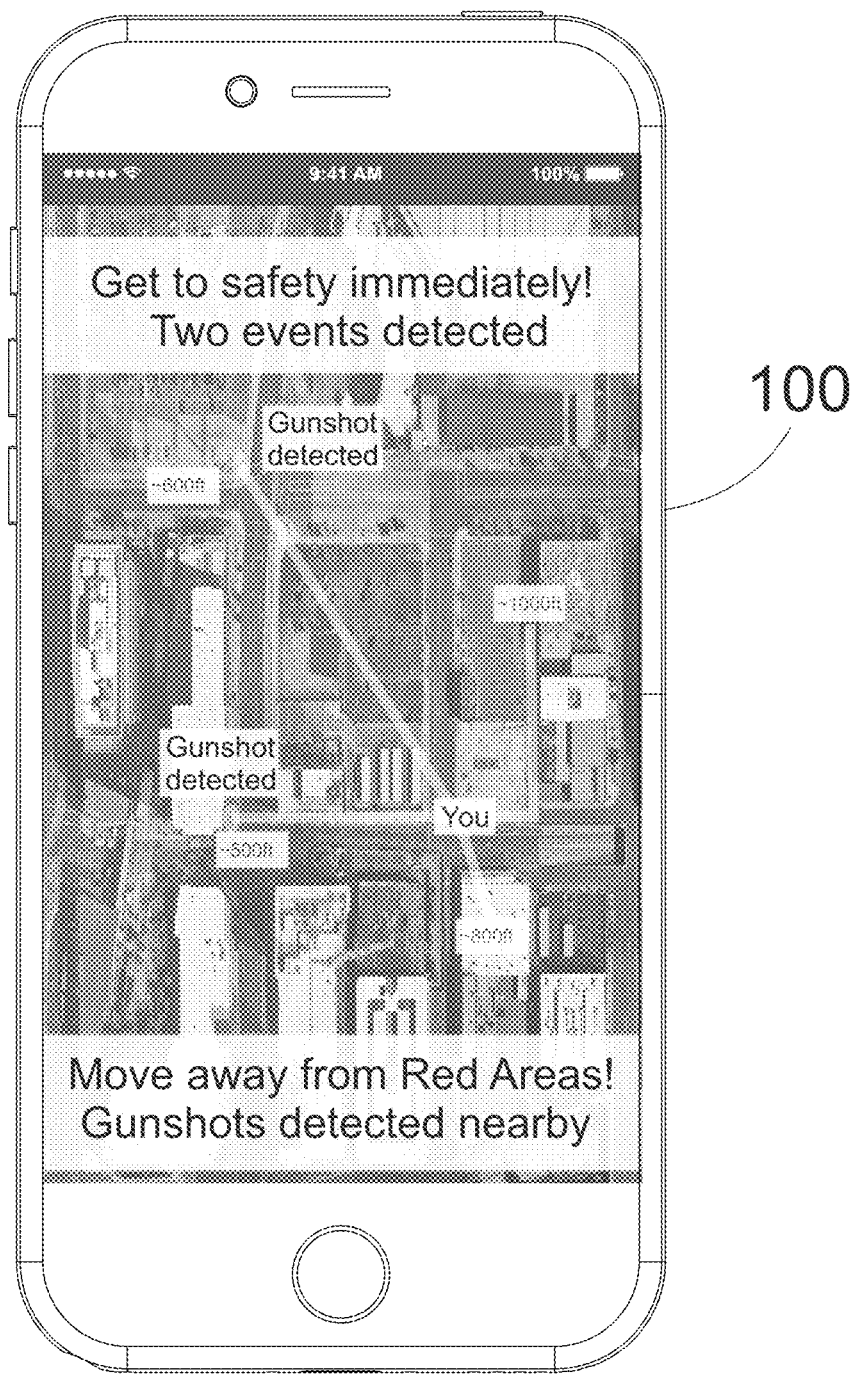
FIG. 7 is a view of a public safety notification of a danger detection system on a mobile device, in accordance with embodiments.
Figure 8:
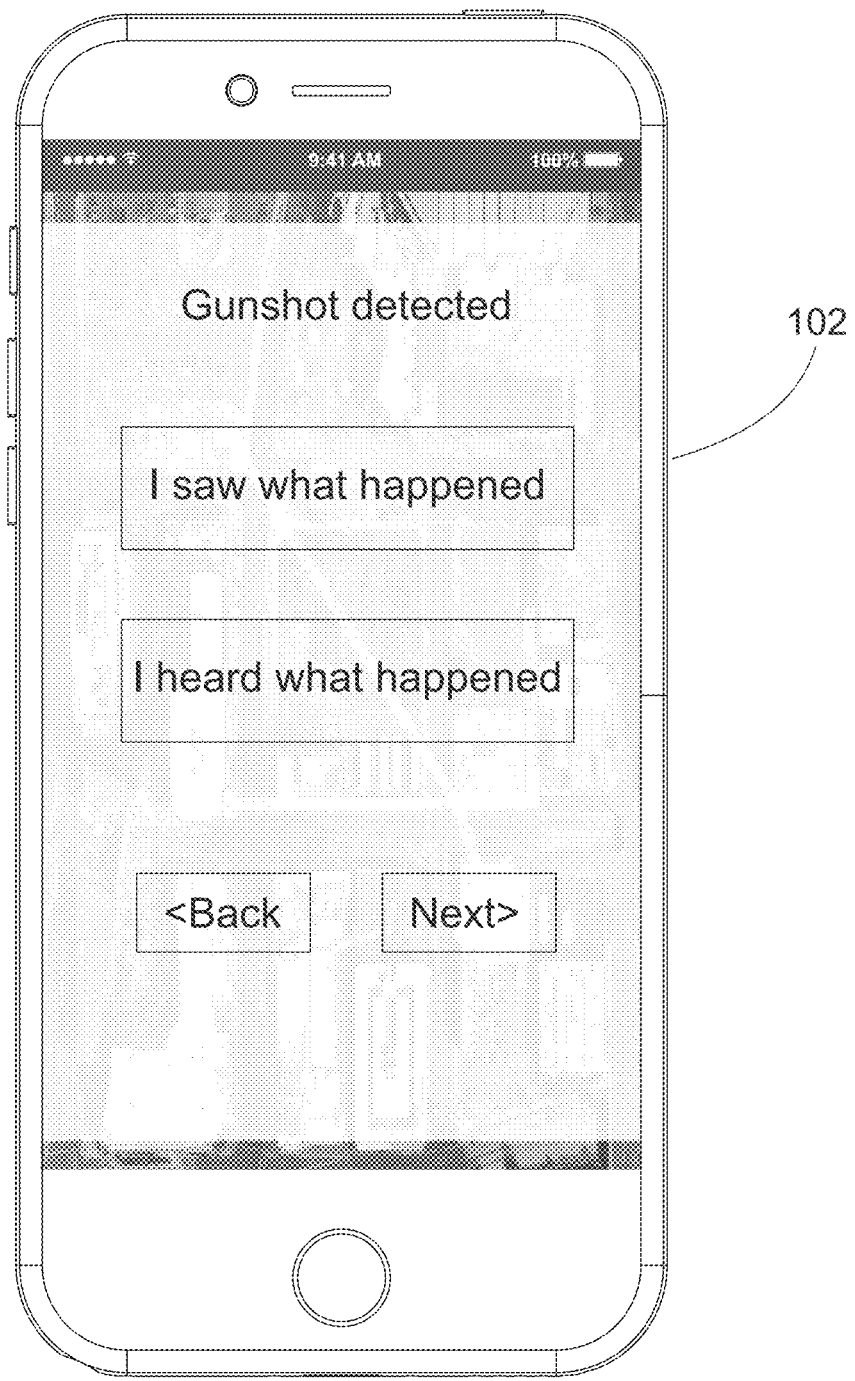
FIG. 8 is a view of a gunshot detection determination/witness reporting interface of a danger detection system on a mobile device, in accordance with embodiments.
Figure 9:
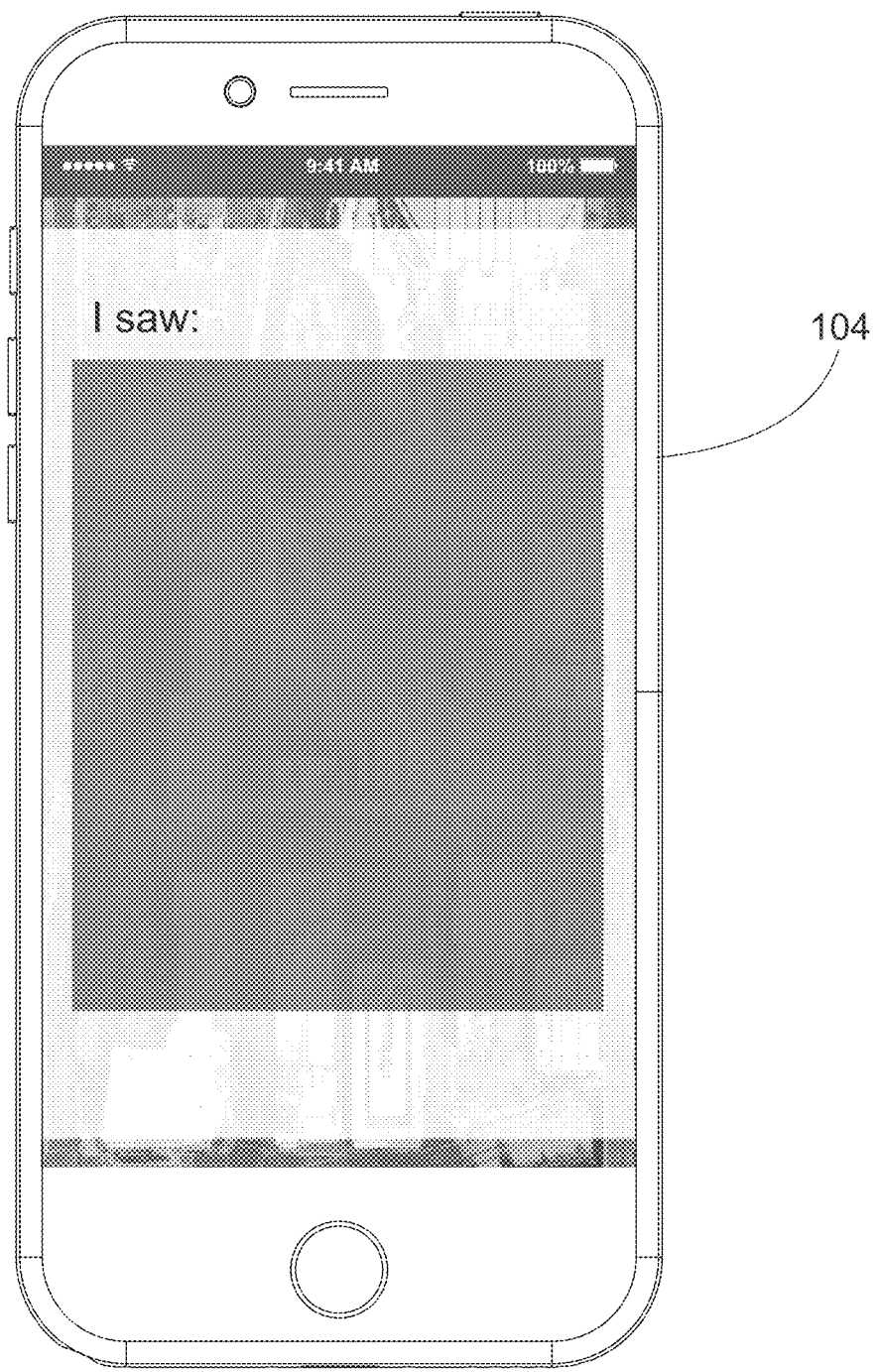
FIG. 9 is a view of a user "saw" determination/witness reporting interface of a danger detection system on a mobile device, in accordance with embodiments.
Figure 10:
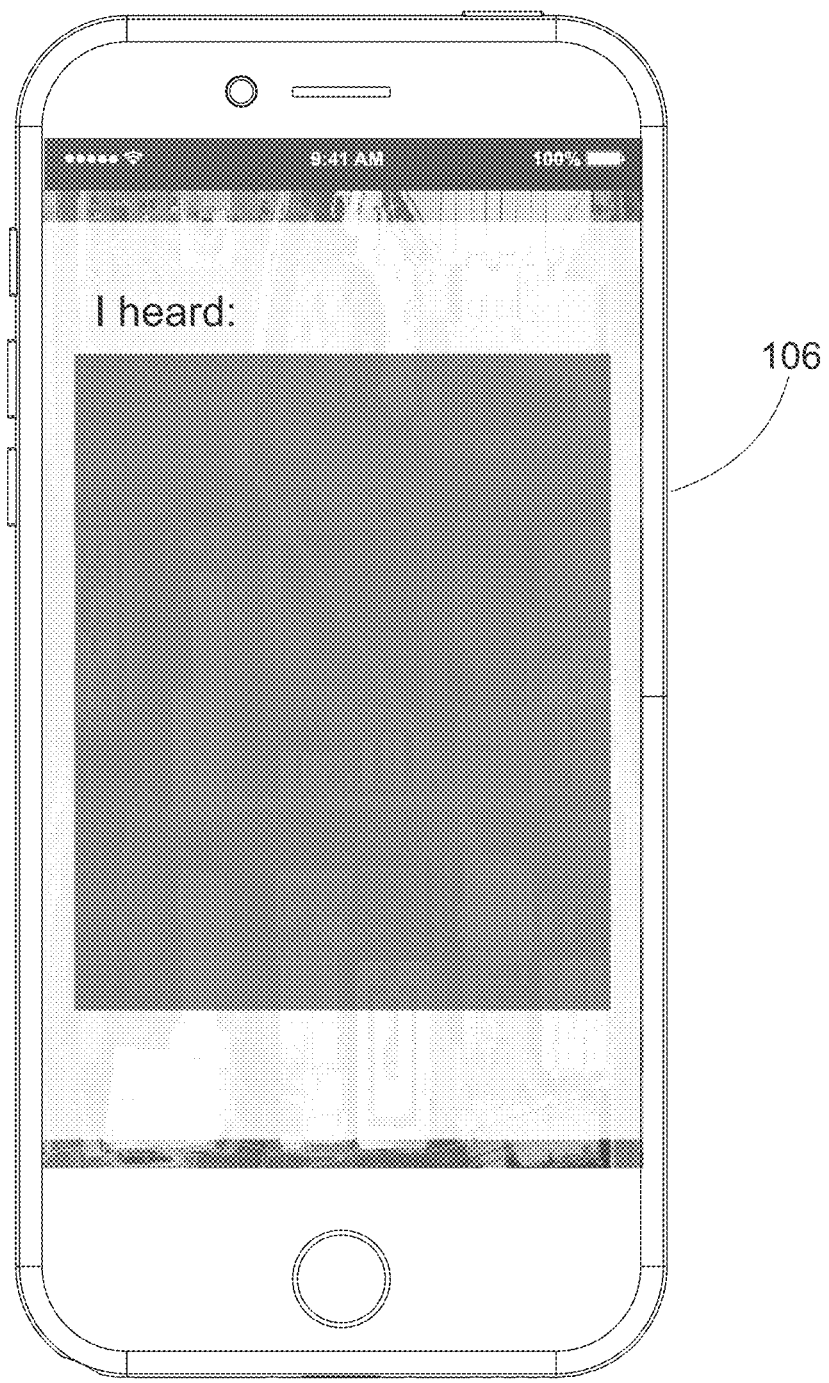
FIG. 10 is a view of a user "heard" determination/witness reporting interface of a danger detection system on a mobile device, in accordance with embodiments.
Figure 11:
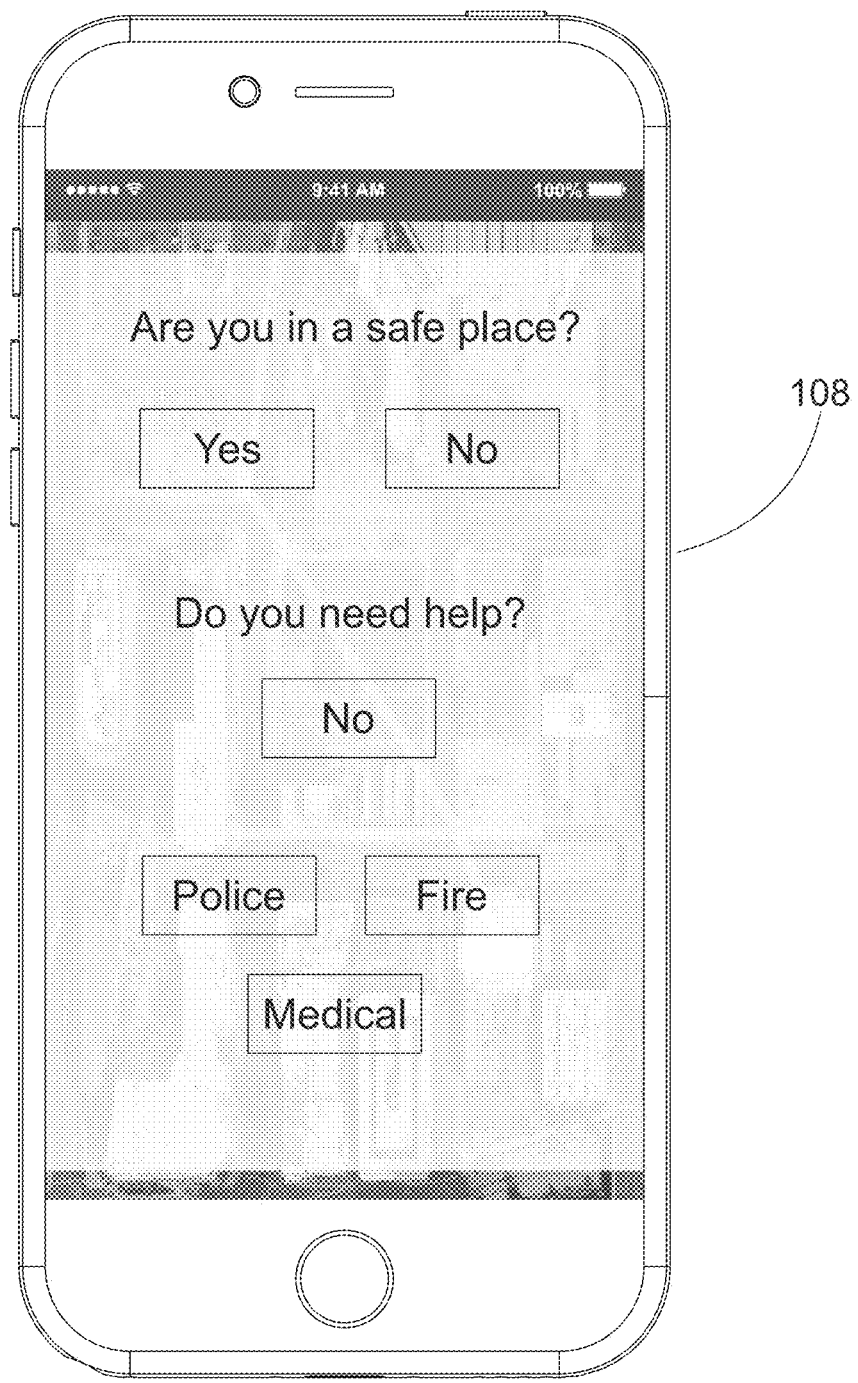
FIG. 11 is a view of a user "status" interface of a danger detection system on a mobile device, in accordance with embodiments.
Figure 12:
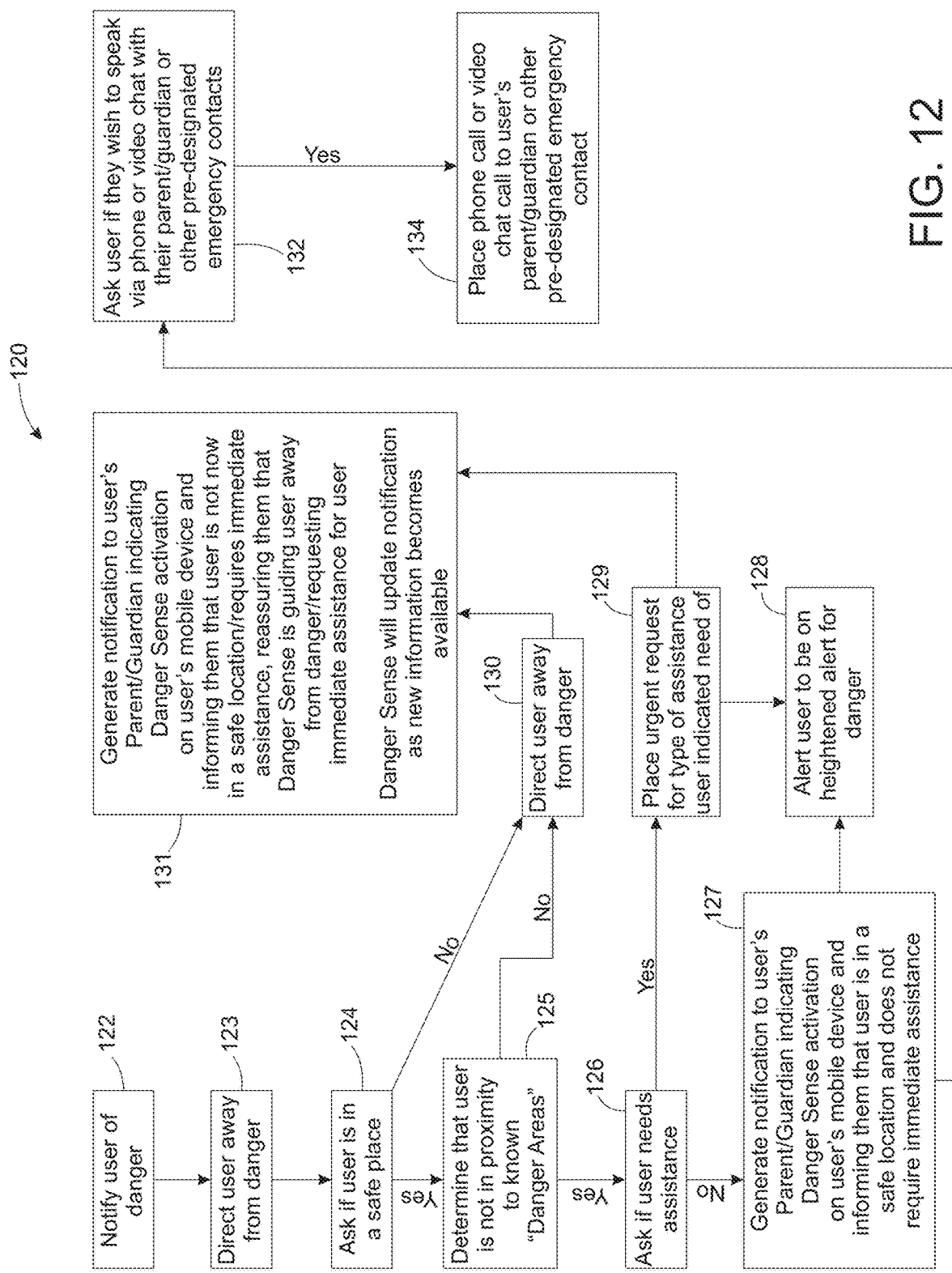
FIG. 12 is a flow chart of a method of using a danger detection system with a parent/guardian module, in accordance with embodiments.
Figure 13:
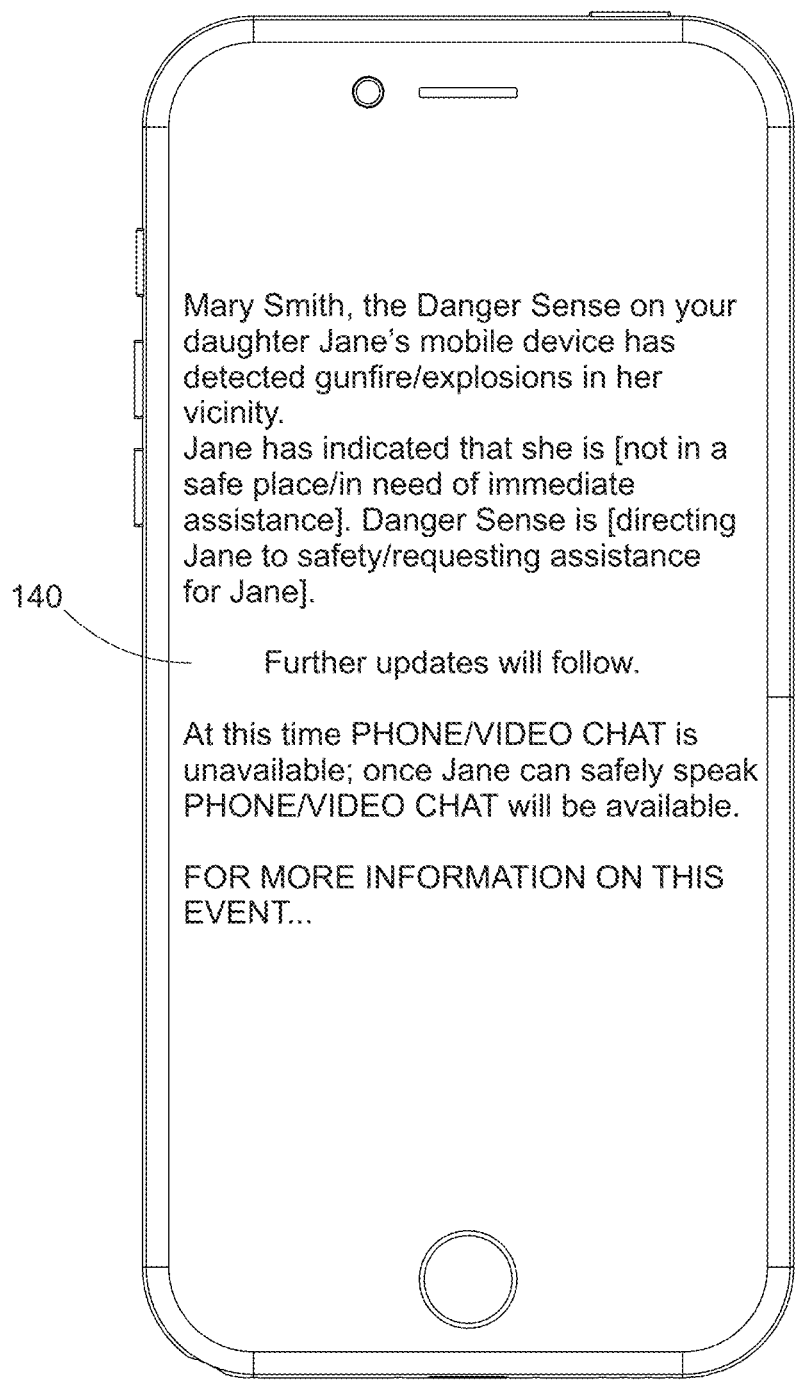
FIG. 13 is a view of a guardian notification interface of a danger detection system on a mobile device, in accordance with embodiments.
Figure 14:
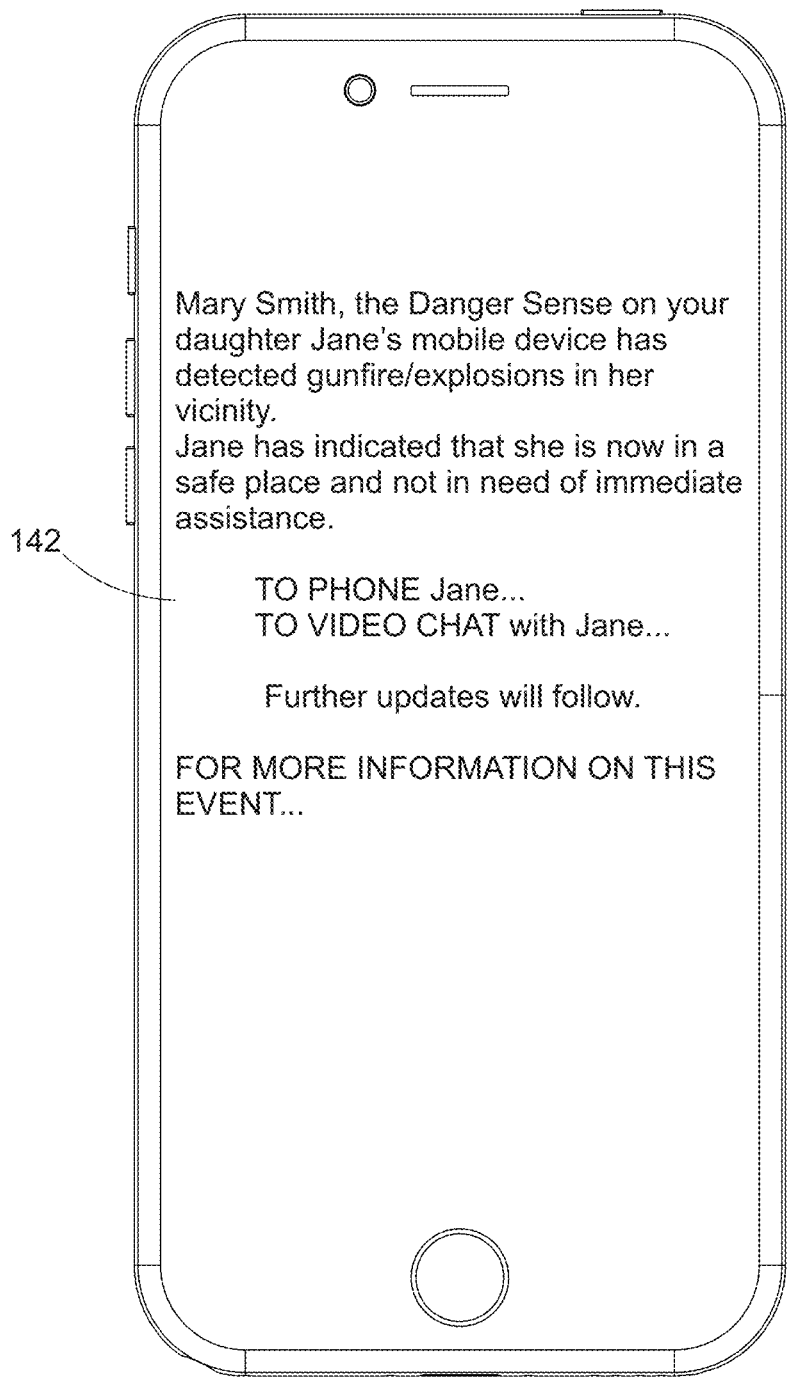
FIG. 14 is another view of a guardian notification interface of a danger detection system on a mobile device, in accordance with embodiments.
Figure 15:
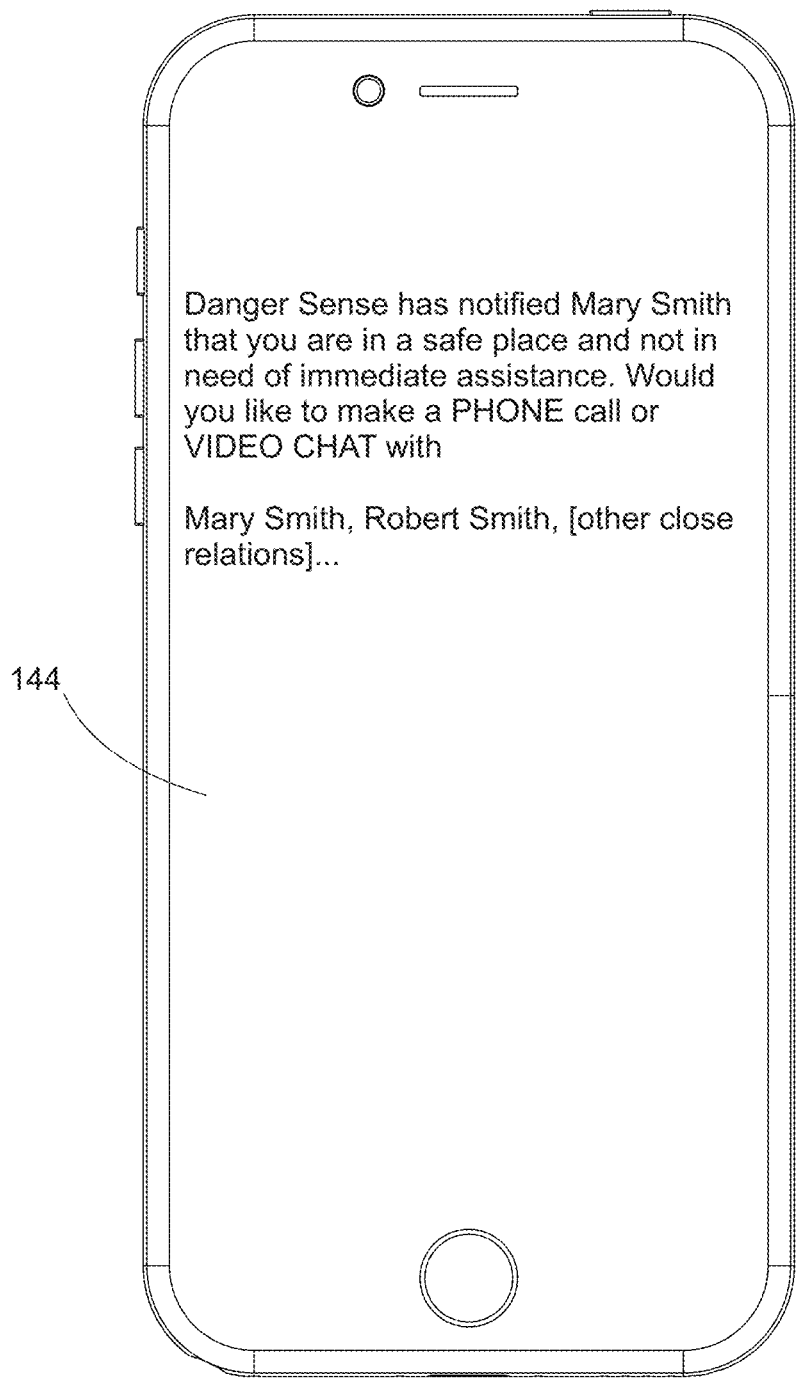
FIG. 15 is a view of a child notification interface of a danger detection system on a mobile device, in accordance with embodiments.

FIG. 5 depicts an embodiment of a notification generated by the danger detection system and displayed to a user on a mobile device. The notification may include a map that marks a user location 90, gunshots detected 92 and 94 and the relative location with regard to the user location 90. The system may display and provide a safety path to various "safe" areas, such as, but not limited to safe areas 96 and 98. In embodiments of the system as depicted in FIG. 5 the danger areas may be indicated in red and the safe areas may be indicated in green. While these colors have been depicted in the drawings, it will be understood that any type of differentiation between dangerous and safe areas may be utilized.

FIGS. 6-11 depict a flow chart of possible user interface screens according to embodiments of the invention that may be displayed on a mobile device for notification to and interaction by the user. The system may include depicting on a display of the mobile device a public safety notification 100 that alerts the user to a gunshot danger in proximity to their location and directs the user away from the danger to safe areas (See FIGS. 6 and 7). The system may then request information from the user in a gunshot detection "determination/witness reporting" interface 102, wherein the user may indicate information that the user may have with regard to the gunshot, such as, but not limited to whether the user saw what happened or heard what happened (See FIGS. 6 and 8). The system may then enable user input interfaces such as a user "saw" interface 104 and a user "heard" interface 106, wherein the user may input what he or she saw and/or heard (See FIGS. 6, 9 and 10). The system may then display a user status interface 108, wherein the user can indicate that he or she is in a safe place and/or if the user needs help (See FIGS. 6 and 11). These user interfaces are provided solely for the exemplary purposes of this disclosure and are not considered to be a limitation as to the types and forms of user interfaces or of the types of information collected and displayed by the system. Other various user interfaces may be utilized without departing from the scope of the invention and this disclosure.

Figure 16:
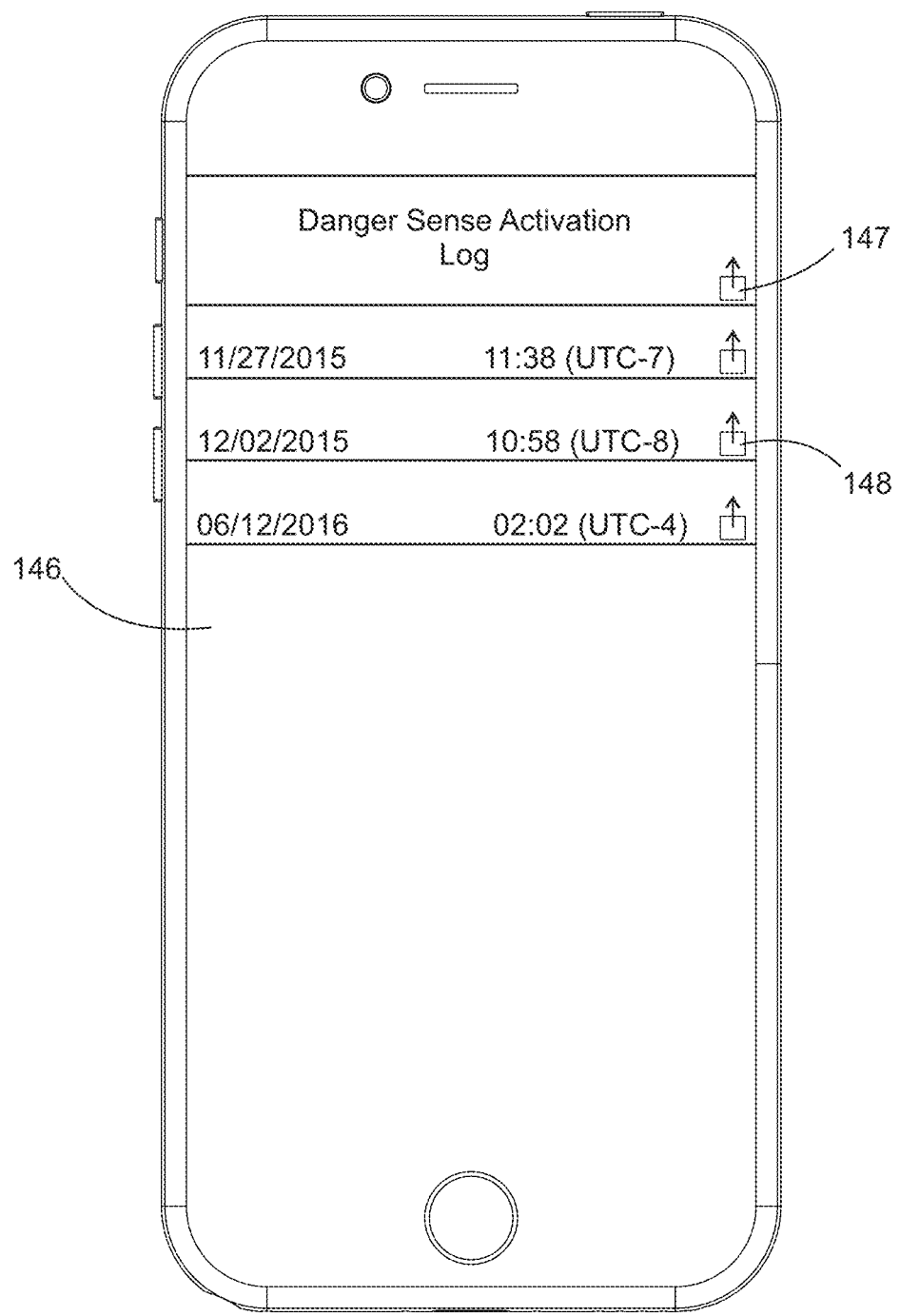
FIG. 16 is a view of a export interface of a danger detection system on a mobile device, in accordance with embodiments.

Referring further to the drawings, FIG. 16 depicts an export interface 146 of system 10 that include an option for maintaining a log of activation danger events. The logged events may then be exported using the export buttons 147 and 148, wherein eport button 147 provides for export of the entire lag and export button 148 provides for export of a particular event log. This may be utilized by a user for further analysis and may utilized for legal matters as evidence if necessary.

Referring to the drawing figures further, FIGS. 12-15 depict the system 10 that may include a parent/guardian interface that operates within system 10 in a method of parent/guardian notification 120. Method 120 may begin with notifying user of danger (Step 122); followed by directing user away from danger (Step 123). The method 120 includes the system through the display for the user computing device (such as a mobile device) asking if user is in a safe place (Step 124). If the user is not in a safe place, the system directs the user away from danger (Step 130). If the user is in a safe place, the system determines if a user is not in proximity to known danger areas (Step 125). If the user is in proximity to known danger areas, the system directs user away from danger (Step 130). If the user is not in proximity to known danger, the system through an interface on the user computing device asks if user needs assistance (Step 126). If the user does need assistance the system places urgent request for type of assistance user indicated need of (Step 129) and alerts user to be on heightened alert for danger (Step 128). If the user does not need assistance, the system generates notification to user's parent/guardian indicating the system activation on user's computing device (mobile device) and informs the parent/guardian that the user is in a safe location and does not require immediate assistance (Step 127); the system asks user if he/she wishes to speak via phone or video chat with his/her parent guardian or other pre-designated emergency contacts (Step 132). If user wishes to speak, the system places a phone or video call to user's parent/guardian to other pre-designated emergency contact (Step 134).

During the entire operation of method 120, Step 131 is continuously operating to generate notification to user's parent/guardian indicating system activation one user's mobile device and informs parent/guardian whether the user is not not in a safe location, requires immediate assistance and reassurance that the system is guiding user away from danger and requesting any immediate assistance for user, and further provides update notifications as new information becomes available. For example, when the system 10 is activated on user's mobile device and the user is in danger, a notification is automatically sent to the user's parent/guardian such as with guardian notification interface 140 of FIG. 13 notifying the parent/guardian that user is in danger and not in a safe place and/or needs immediate assistance. Once the user moves along directed paths/routes to safety, the system provides an update such as guardian notification interface 142 of FIG. 14 to the parent/guardian notifying that user is now in a safe place and providing parent/guardian an option to initiate communication with user. The system 10 also notifies user through user notification interface 144 of FIG. 15 that user's parent/guardian has been notified of user's current status and further provides an option for user to initiate communication with parent/guardian.

While it is shown certain types and forms of communication between a user and parent/guardian or other emergency contact, it will be understood that embodiments of the invention are limited to the depicted manner and form of notification. Other types of notification with various words and stylization may be utilized so long as the user's status is accurately communicated to the parent/guardian or other emergency contact.

It will be understood that while the danger detection system has been disclosed with regard to a gunshot that activated the system, other types of danger sounds may also activate system. For example and without limitation, an explosion may be the sound determined by the danger detection system that activates the processes. It should also be appreciated that the danger detection system includes program instructions that allow for the system to determine differences between actual gunfire or explosions and those that are not real, such as in a TV show or film. A database of sounds for comparison by the system to authenticate the sound as being an actual sound may be included as part of the system.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

The invention claimed is:
1. A danger detection system comprising:
one or more user computing devices programmed to:
receive from a microphone of the one or more user computing devices a signal indicating a gunshot-like sound and automatically determine if the gunshot-like sound is a gunshot;

automatically determine an approximate location of the gunshot;

automatically determine if the one or more user computing devices are near an authorized shooting facility;

automatically generate metadata tags pinpointing the distance and direction of the gunshot with respect to the one or more user computing devices; and automatically generate and send to a display of the one or more user computing devices a safety notification in response to determining if the gunshot is within a predetermined distance to the one or more user computing devices and the one or more user computing devices are not near an authorized shooting facility, the safety notification comprising at least one possible safe escape route that avoids the approximate location of the gunshot that was automatically determined from the gunshot-like sound by guiding one or more users to locations having a security presence;

automatically initiate video and audio recording function of the camera when increased tonal changes are detected;

differentiate the sounds of different gunshots;

determine if sounds are actual sounds or simulated sounds using a database of sounds for comparison; and authenticate the gunshot-like sound as being an actual sound of a gunshot.

2. The system of claim 1, the one or more user computing devices further programmed to determine whether all geolocation features of the one or more user computing devices are activated and automatically activate all inactive geolocation features.

3. The system of claim 2, the one or more user computing devices further programmed to automatically generate an alert to be on heightened alert for danger in response to the gunshot location is not within the predetermined distance.

4. The system of 3, the one or more user computing devices further programmed to store, anonymously in concert, data collected and generated by the one or more computing devices in response to activation of the system, wherein the data collected and gathered is stored as an activation event, and to export all activation events or a particular activation event for external use and analysis.

5. The system of claim 4, the one or more user computing devices further programmed to automatically display guided input screens requesting input from the user regarding seeing what happened or hearing what happened when the system detected the gunshot, and automatically display guided input screens requesting input from the user regarding if the user is in a safe place and if the user needs help.

6. The system of claim 5, the one or more user computing devices further programmed to:

automatically generate and send a notification to a pre-designated contact computing device indicating the system activation of the user's computing device, wherein the notification included information whether the user is in a safe location;

automatically generate and send a notification to the one or more user computing devices that pre-designated contact has been notified of the one or more users' current status; and automatically generate and display on the one or more user computing devices and the pre-designated contact computing device, once the one or more users are safe location, a request for communication input whether the one or more users or the pre-designated contact wishes to speak via phone or video chat; and in response to receiving a selection of to call or video chat, automatically initiate a communication connection between the one or more user computing devices and the pre-designated contact computing device.

7. The system of claim 6, further comprising one or more devices that have been integrated into the system wherein the one or more devices are configured, when within a predetermined distance of the approximate location of the gunshot, to automatically adjust their settings to adjust recordings of the area surrounding where the approximate location of the gunshot, such as by using pan-tilt-zoom, focus, infrared-mode, or increasing frame-rate if the device has a variable frame rate.

8. The system of claim 7, further comprising the one or more devices that have been integrated into the system to automatically increasing streetlight brightness on the one or more devices.

9. The system of claim 8, the one or more user computing devices further programmed to: automatically activating system enhancing integration comprising traffic signal override.

10. The system of claim 9, the safety notification generated and sent to the display of the one or more user computing devices further comprising a map having danger areas indicated by one color and the safe areas indicated by another color, the one or more user's location, a gunshot detected and the relative location of the gunshot detected with regard to the one or more user's location.

11. The system of claim 10, wherein the camera is a body camera and is further programmed to receive and store data gathered from gyroscopic sensors and accelerometers in the camera, wherein the data comprises orientation of the camera, direction the camera is facing with respect to the location of the gunshot and how the user moved as recorded by the camera in response to the detected gunshot.

* * * * *